United States Patent Office 3,526,674
Patented Sept. 1, 1970

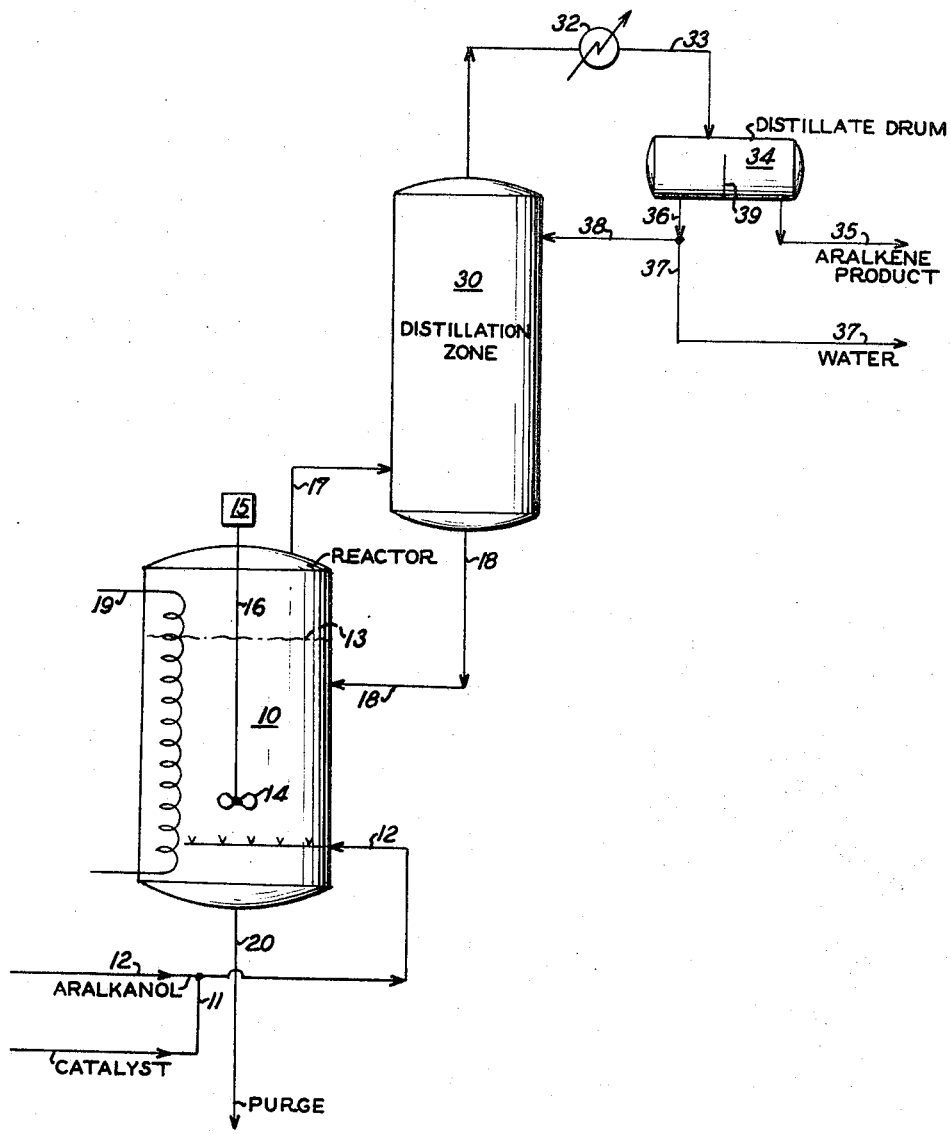

3,526,674
PROCESS FOR THE DEHYDRATION
OF ARALKANOLS
Mitchell Becker, Teaneck, and Sargis Khoobiar, Clifton,
N.J., assignors to Halcon International, Inc., a corporation of Delaware
Filed Aug. 5, 1968, Ser. No. 750,035
Int. Cl. C07c 5/18, 15/10
U.S. Cl. 260—669                                10 Claims

ABSTRACT OF THE DISCLOSURE

Aralkanols are catalytically dehydrated to form aralkenes, such as, for example, styrene or alpha-methylstyrene by conduct of the dehydration in the presence of a liquid phase reaction medium at a temperature above about 200° C. but below the decomposition temperature of the liquid phase reaction medium. High surface area aluminas are preferred catalysts for the dehydration.

BACKGROUND OF THE INVENTION

Aralkenes such as styrene are extremely important articles of commerce and have been commercially prepared primarily by one of two routes. The first is by dehydrogenation of aralkanes. The second involves oxidation of aralkanes to aralkanols which are then dehydrated to form aralkenes. Until recently, the latter method has been less desirable, primarily because of the lower yields and greater process complexity.

Recently, however, new processes have been developed permitting simultaneous production of oxirane compounds and aralkanols at significantly lower costs than heretofore practicable. See U.S. Pats. Nos. 3,350,422 and 3,351,635. These new processes have significantly enhanced the importance of aralkanol dehydration processes.

Most prior art aralkanol dehydration processes have been conducted in the vapor phase employing titania catalysts. Such catalysts often require frequent regenerations to maintain acceptable conversions and selectivity at high levels. Regeneration of catalysts in such processes involves removal by burning of deposited carbonaceous materials coating the catalyst and inhibiting its activity. But, the removal of such deposits by burning also creates significant problems because of the high temperatures developed during the burning. To withstand these temperatures, requires the use of alloy steels since ordinary carbon steels do not have sufficient strength to withstand the temperatures developed.

Liquid phase aralkanol dehydration processes would appear to avoid such problems but none reported to date has been commercially acceptable. Processes reported in the literature as applicable to liquid phase paraffin alcohol dehydration have generally not proved suitable for aralkanol dehydration. Thus, for example, Brandenberg and Galat report that dehydration of paraffin alcohols in the presence of boric acid gives typical yields of 85–95% but that yields of only 50% are obtained in the dehydration of alpha-phenylethanol; see J. Am. Chem. Soc. 72, 3275–6 (1950). Another process, that of U.S. Pat. No. 2,866,832, discloses the liquid phase dehydration of cumyl alcohol to alpha-methylstyrene and reportedly gives high selectivity with little polymer formation, but conversions and reaction rates are low, thereby necessitating large and costly recycle and reaction facilities to provide sufficient time to obtain even these low conversions.

British Patent No. 797,989 discloses a process for the liquid phase dehydration of alcohols to olefins in the presence of acid catalysts and polar solvents having a higher boiling point than that of the olefin produced. While no doubt suitable for dehydration of paraffin alcohols, the presence of large amounts of polar solvents, necessary to provide the solvent effect, can radically interfere with product recovery, especially since most suitable solvents boil at temperatures which are lower than the boiling temperatures of alpha-phenylethanol. Moreover, the catalysts of this process promote reaction between the solvents (e.g., phenol) and the aralkene product to form high boiling residues (see U.S. Pat. No. 2,866,832). Lastly, the necessity for special extraneous solvents also increases process cost.

Any commercial aralkanol dehydration process of course should give high conversions with high selectivities to aralkene. Selectivities of 100% are sought but are not practicably obtainable and some by-product formation is unavoidable. However, in aralkanol dehydration processes, the nature of the by-products formed has a major influence on the economic attractiveness of the process. When aralkanols are dehydrated to aralkenes, some loss of selectivity is attributable to formation of polymer, which, while it does represent a yield loss, does not pose major problems in recovery or aralkene product. If, however, aralkane by-product, such as ethylbenzene, is formed, to any appreciable extent, it becomes extremely difficult to produce high purity aralkene since the relative volatility involved in aralkene-aralkane fractionations is extremely low. Thus, in addition to high conversion and high selectivity, the nature of the by-products should be such that very little aralkane is formed during the dehydration reaction.

The process of this invention permits the obtaining of high aralkanol dehydration conversions to aralkene with high selectivity and with but little formation of aralkane by-product.

SUMMARY OF THE INVENTION

Surprisingly, it has now been found that enhanced selectivities are obtained by conduct of the reaction at higher temperatures than those used in the prior art, namely at temperatures above about 200° C. Reducing reaction temperature to a level below about 200° C. reduces selectivity. Accordingly, the process of this invention involves the catalytic dehydration of an aralkanol in the presence of a liquid phase reaction medium at a temperature above about 200° C. but below the decomposition temperature of the liquid phase reaction medium.

The process of this invention is especially applicable to the dehydration of alpha-phenylethanol to produce styrene and to the dehydration of cumyl alcohol to produce alpha-methylstyrene, although not limited solely to these embodiments.

In order to obtain commercially acceptable reaction rates, conversions and selectivities, it is necessary that a catalyst be employed in the process of this invention. Those catalysts known to the prior art as suitable for liquid phase alcohol dehydration processes (such as, for example, the mineral acids, the organo-sulphonic acids, and the carboxylic acids) are suitable for use in the process of this invention. However, this invention also encompasses the use of a particularly preferred and novel class of dehydration catalysts having significant advantages over those disclosed in the prior art. These preferred catalysts are high surface area aluminas having a surface area greater than 15 sq. meters/gram. These materials appear to act as Lewis acids in the dehydration reaction.

As hereinabove indicated, this invention requires that the dehydration be conducted in the presence of a liquid phase reaction medium. This liquid phase reaction medium can be either polar or non-polar, the only requirement being that the reaction medium be high boiling, i.e., that the liquid phase reaction medium have a boiling point which is higher than boiling point of the aralkanol to be dehydrated. The greater the magnitude of this difference in boiling point, the easier it becomes to separate product from solvent. Thus, for example, tri-phenylmethane is an example of a suitable non-polar liquid phase reaction medium for the conduct of this invention and pyrogallol and 1-naphthol are examples of suitable polar liquid phase reaction media.

A particularly preferred liqud phase reaction medium is the residue formed during the dehydration reaction which, if accumulated in sufficient quantity, is an eminently satisfactory material. However, this material suffers from one drawback because its foaming characteristics results in excessive froth formation. Thus, use of this material requires the use of an anti-foaming agent. Conventional anti-foaming agents, such as the silicones, are unsatisfactory and appear to act as poisons for the reaction since, when such materials are added, conversion and selectivity fall rapidly and aralkane by-product formation increases to a prohibitive extent. On the other hand, the addition of a small amount of a phenolic compound (e.g., phenol itself, cresols, alkyl substituted phenols or cresols and the like) rapidly suppresses the foaming without affecting conversion or selectivity.

DETAILED DESCRIPTION OF THE INVENTION

In the process of this invention, aralkanols are dehydrated to aralkenes. This reaction requires a catalyst, and is carried out in the presence of a liquid phase reaction medium at a temperature above about 200° C. This process can be carried out in either batch or continuous manner and is especially suited for continuous commercial operation.

During the course of the reaction, aralkanol reacts to form water and the desired aralkene product. At the reaction conditions employed, the water and the aralkene are volatilized substantially as rapidly as they are formed and are therefore readily removed from the reaction vessel. Aralkanol, which can also be volatilized as the reaction proceeds, is preferably condensed and returned to the reaction vessel to effect substantially complete conversion thereof; i.e., to effect conversions of the order of 90% or more. High selectivities to formation of the aralkene, corresponding in carbon structure to the aralkanol starting material, are obtained, i.e., reaction selectivities of the order of 90% or more are readily achieved. Some by-products are formed in the reaction, albeit in small quantities. The small amount of aralkane by-product which is formed is volatilized along with the water and aralkene product and is sufficiently small in amount not to require removal to meet desirable product purities. The high-boiling by-products remain essentially unvolatilized and are purged from the liquid phase reaction medium, periodically or continuously, when such materials accumulate to an undesirable extent.

As hereinabove indicated, the process of this invention is carried out in the presence of a liquid phase reaction medium, the presence of which is essential for the conduct of the process of this invention. The logical inference to draw from this is that the dehydration occurs in the liquid phase. This is, however, not necessarily so since the aralkene product and water formed in the dehydration are volatilized as the reaction proceeds and it is possible that the dehydration reaction occurs at the vapor-liquid interface. Accordingly, no representation is herein made with regard to the phase in which the dehydration reaction of the process of this invention occurs.

As hereinabove and as hereinafter used in this specification and in the appended claims, the following terms have the following meanings unless otherwise indicated:

The term "conversion" designates the ratio, expressed on a molar basis, of $$\frac{\text{Moles aralkanol reacting}}{\text{mole of aralkanol fed}}$$

The term "selectivity" designates the ratio, expressed on a molar basis, of $$\frac{\text{Moles of aralkene formed}}{\text{mole of aralkanol reacting}}$$

The term "yield" designates the ratio, expressed on a molar basis, of $$\frac{\text{Moles of aralkene formed}}{\text{mole of aralkanol fed}}$$

The process of this invention is applicable to the production of styrene and alkyl substituted styrenes by dehydration of the corresponding aralkanols. Thus, suitable aralkanol starting materials include alpha-phenylethanol itself, the alpha-alkyl-alpha-phenylethanols and the alkyl ring substituted derivatives of the foregoing. Suitable aralkanol starting material for the invention have the following structural formula:

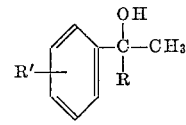

wherein R and R' are each independently selected from the group consisting of hydrogen and lower alkyl radicals, preferably those lower alkyl radicals containing up to three carbon atoms each, although radicals having as many as five carbon atoms each can be employed. It is also possible to employ aralkanol starting materials which have more than one alkyl ring substituent in the process of this invention. It is generally desired to use such aralkanol starting materials having the above structural formula wherein R and R' together have no more than three carbon atoms. Accordingly, preferred aralkanol starting materials include alpha-phenylethanol, alpha-methyl-alpha-phenylethanol (cumyl alcohol), alpha-ethyl-alpha-phenylethanol, alpha-4-methylphenylethanol, alpha-3,5-dimethylphenylethanol, alpha-methyl-alpha-4-isopropyl-phenylethanol and the like. Especially preferred aralkanol starting materials are alpha-phenylethanol and alpha-methyl-alpha-phenylethanol (cumyl alcohol) since the corresponding aralkene products (styrene and alpha-methylstyrene respectively) are large scale articles of commerce. Obviously, mixtures of the foregoing aralkanols can also be dehydrated and, in such cases, mixtures of aralkene products are obtained.

Pure aralkanol feedstocks are not required in the process of this invention; i.e., impurities normally associated with such materials have little or no deleterious effect upon the process. Thus, in the case of alpha-phenylethanol, impurities such as acetophenone, beta-methylbenzyl alcohol, and benzylalcohol can be present in the feed to the dehydration in amounts of as much as 20 to 30% by weight. As will be appreciated by those skilled in the art, such impurities are formed in aralkane oxidations to form the aralkanol and it is a feature of this invention that such impurities need not be removed from the dehydration feed.

Reaction temperature is controlled to be above about 200° C. but below the decomposition temperature of the liquid phase reaction medium. Decomposition temperature, as herein used, refers to the temperature above which the rate of breakdown of the liquid phase reaction medium becomes appreciable (i.e., that the rate of decomposition of the liquid phase reaction medium equals or exceeds the rate of formation of the high-boiling residue) and, of course, depends on the nature of the reaction medium employed. When using stable high boiling hydrocarbons such as tri-phenylmethane (B.P.=359.2° C.) as the reaction medium, reaction temperatures of as much as 400° C. or more can be used using appropriate pressure. The decomposition characteristics of the high boiling residue formed in the dehydration reaction, which is a preferred liquid phase reaction medium, are such that it is desired to avoid temperatures above about 350° C. and it is preferred to avoid temperatures above about 330° C. In general, it is desired to employ reaction temperatures which are within the range of from about 220° C. to about 310° C. and it is preferred to employ reaction temperatures which are within the range of from about 250° C. to 300° C.

Since the dehydration reaction is endothermic, control of reaction temperature requires heat input to the reaction. Such can readily be provided by known techniques, for example by inclusion of heating coils within the dehydration reactor.

Aralkanol and aralkene concentrations within the liquid phase affects the rate of reaction and may also affect selectivity. Over wide limits these concentrations can be controlled independently of reaction temperature by suitable adjustment of total system pressure and partial pressures. Lowering of the total system pressure reduces these concentrations in the liquid phase. Similarly, the introduction of vaporous materials which are inert under the reaction conditions also reduces concentrations in the liquid phase by reducing component partial pressures. Suitable inert vapors for this purpose include such materials as helium, neon, argon, methane, ethane, propane, carbon dioxide, nitrogen and the like. Yet another method of controlling partial pressures involves injection of water into the reactor feed. Surprisingly it has been found that this has but a minor effect upon aralkanol conversion and can favorably affect selectivity. For example, addition of 20% by weight of water based on aralkanol feed reduces the make of high-boiling residue from 5% (with no water addition to the feed) to less than 1% without significantly affecting conversion. For this purpose, therefore, the feed to the aralkanol dehydration process of this invention can contain from 1% to 50% by weight of water and preferably contains from 5% to 20% by weight of water.

It should be noted that, in general, lower reaction pressure favorably affects the reaction. Accordingly, it is desired to operate the process of this invention at as low a pressure as is feasible in the particular system employed. While either atmospheric, super-atmospheric or sub-atmospheric pressures can be used in the process of this invention, it is normally desired to employ pressures which are at or slightly above atmospheric. Though use of sub-atmospheric pressures further favors the desired reaction, it also increases the cost of construction of equipment and increases the danger of oxygen in-leakage which is both potentially hazardous and detrimental to the stability of the aralkene products. Accordingly, it is desired to operate the process of this invention at pressures which are between 15 p.s.i.a. and about 50 p.s.i.a. and it is preferred to operate the process of this invention at pressures which are between about 15 p.s.i.a. and 25 p.s.i.a. As hereinabove indicated, substantially higher pressures can be used, for example as high as 250 p.s.i.a. or even higher, although when using such high pressures the conjoint use of an inert gas to reduce aralkanol partial pressure is greatly preferred. Similarly, it is also possible to operate the process of this invention at pressures which are as low as 0.1 p.s.i.a. or even lower, though it is seldom necessary to employ such low pressures.

Substantially any high-boiling organic material can be used as the liquid phase reaction medium in the process of this invention. By "high-boiling" as herein used is meant that the reaction medium boils at a temperature desirably at least 10° C. and preferably at least 30° C. above the temperature at which the aralkanol to be dehydrated boils. Suitable materials for use as liquid phase reaction media in this process include high boiling hydrocarbons such as tri-phenylmethane, anthracene, phenanthrene, high-boiling hydrocarbon petroleum distillates such as the white oils, the mineral oils and other suitable petroleum distillate cuts. Also suitable as liquid phase reaction mediums are such polar materials as the cresols, pyrocatechol, resorcinol, pyrogallol, 1,2,4-benzenetriol and phloroglucinol and their alkyl substituted derivatives.

As hereinabove indicated, a particularly preferred liquid phase reaction medium is the high boiling residue formed during the dehydration reaction itself since this material is indigenous to the process and available at substantially no cost. It is not practicable to characterize the nature of this material other than to say that it is believed to comprise polymers of the aralkene together with ether-type materials presumably formed by the reaction between two molecules of aralkanol. Since the selectivity of the dehydration in accordance with this invention is high, the residue is formed in only small quantity and it is therefore necessary to accumulate the residue either for batch or for continuous operation. In batch operation this presents slight difficulty since sufficient residue can be accumulated during the conduct of prior batch dehydration cycles. In continuous operation, however, it is normally necesary to start operations using an extraneous high boiling reaction medium (sometimes referred to as a "heel"). As residue accumulates during subsequent operation, the heel is gradually displaced and replaced by the residue until, after a period of operation, the liquid phase reaction medium consists essentially of the residue without any significant amount of the heel remaining.

Aralkanol space velocities (defined as volumes of aralkanol feed per hour per volume of liquid phase reaction medium) between about 0.1 and about 5 can be used to effect substantially complete conversions, i.e., to obtain aralkanol conversions of as high as 85% or more. It is desired to employ space velocities, based on aralkanol, between about 0.2 and about 2.0 and it is preferred to employ such space velocities between about 0.3 and about 1.5.

The liquid phase dehydration reaction of this invention requires the presence of a catalyst since, in the absence of a catalyst, the reaction rate is prohibitively low. A variety of catalysts suitable for the conduct of this invention are disclosed in the prior art. These include mineral acids such as sulphuric acid, perchloric acid and phosphoric acid, the carboxylic acids such as oxalic acid, salicyclic acid; and also includes such acids as p-toluene, sulphonic acid and the other aryl sulphonic acids of benzene and its homologs. The amount of such acids necessary for the conduct of the process of this invention is not especially critical. Amounts of as little as 200 parts per million by weight of acid in the liquid phase reaction medium are sufficient to effectively catalyze the reaction. As much as 2% by weight of acid in the liquid phase reaction medium can be employed and even greater amounts can be used, although not necessary.

Yet another aspect of this invention involves the use of high surface area solids as catalysts for this reaction. By "high surface area" is meant a surface in excess of about 15 sq. meters per gram, and desirably in excess of 25 sq. meters per gram as determined by the Brunauer-Emmett-Teller method; see Smith, Chemical Engineering Kinetics, New York (1956), pgs. 216–221. Suitable high surface area solids include activated carbon, natural clays, molecular sieves, silica-aluminas and activated aluminas.

Optimum surface areas for alumina are in the range of about 40 to 250 sq. meters per gram since aluminas of these surface areas result in the lowest amount of high boiling residue formation. Optimum surface areas for other solid catalysts differ, e.g., for activated carbon, the optimum is within the range of 300 to 500 sq. meters per gram.

The solid catalysts are preferably used in finely divided form so that they can be maintained in suspension in the liquid phase with but a minimum of agitation. Suitably, therefore, the solid catalysts are sized substantially completely (say 95% or more) to pass through at least a 100 mesh sieve and, of course, can be even finer.

Of the solid catalysts useful in this invention, the use of high-purity activated aluminas is preferred since use of these materials gives highest selectivity.

Substantially any alumina of the aforementioned surface areas can be used; however, it is especially desired to use those aluminas having low alkali and alkaline earth metal contents as well as low iron contents, since the presence of such impurities increases both formation of aralkane by-product and high-boiling residue. Aluminas having combined alkali and alkaline earth metal contents below about 2000 p.p.m. (by weight) and iron contents below about 2000 p.p.m. by weight are accordingly preferred. Such aluminas are readily available as articles of commerce and typical characteristics of some of the commercially available ones most suitable for use in the process of this invention are given in the table below.

THE DRAWING

The annexed drawing schematically depicts apparatus for the conduct of the process of this invention and is presented to further illustrate and describe the manner of conducting this process. For ease and simplicity in the following discussion, but without intending thereby to imply any limitation upon the scope of this invention, the feed to the process is assumed to be alpha-phenylethanol which is dehydrated to produce styrene, the dehydration catalyst is assumed to be a high surface area alumina and the liquid phase reaction medium is assumed to be the high-boiling residue formed during the dehydration reaction. It is also to be noted that the arrangement of the schematically depicted apparatus and the fol-

| Supplier and trade name | Alcoa [1] | | Davison [2] | | Conoco [3] | |
| --- | --- | --- | --- | --- | --- | --- |
| | "F-type" | "H-type" | "991" | "992" | "Catapal N-1" | "Catapal N-2" |
| $Al_2O_3$ (wt. percent) | 92.2 | 91.7 | 65 | 97 | 75 | 75 |
| Volatile content (wt. percent) [4] | 6.5 | 5.5 | 35 | 3 | 25 | 25 |
| $SiO_2$ (wt. percent) | .06 | 2.0 | .004 | .004 | 0.01 | 0.01 |
| $Fe_2O_3$ (wt. percent) | .08 | .12 | | | 0.01 | 0.01 |
| Alkali metal (as $Na_2O$, wt. percent) | 0.99 | 1.6 | .002 | .002 | 0.01 | 0.01 |
| Alkaline earth metal (as CaO, wt. percent) | | | .015 | .015 | | |
| Surface area (sq. meters/grm.) | 210 | 390 | 450 | 230 | 150 | 200 |

[1] Aluminum Company of America.
[2] Davison Chemical Corp., Division of W. R. Grace & Company.
[3] Continental Oil Company.
[4] After calcination at about 950° C. (1750° F.). Water is the predominant volatile material present.

While any of the aluminas described above, or any similar alumina, can be used in the process of this invention with satisfactory results, even better results are obtained by subjecting the alumina to a thermal pre-treatment. This pre-treatment is accomplished by heating the alumina at a temperature within the range of from about 400° C. to about 850° C. for a time within the range of from 0.5 to 24 hrs., the shorter times being associated with the higher temperatures. Thus, for example, heat-treating of alumina to a temperature of 800° C. for one hour reduces the amount of high-boiling residue made in the dehydration from as much as 5%, without heat treatment, to only 1–1.5% with the heat treatment. Similar reduction in amount of residue made is achieved by heating the alumina for four hours at 450° C.

While the high boiling residue formed in the reaction is the preferred liquid phase reaction medium, it suffers from the drawback that, under reaction conditions, it foams excessively. This drawback is readily overcome by addition of a small amount of phenol or a phenolic material to the liquid phase reaction medium. Addition of as little as 200 p.p.m. (by weight) of phenol or phenolic material present in the liquid phase reaction medium is effective to suppress the foaming. As much as 10%, or even more, can be used, although use of amounts of phenolic material in excess of about 2% appears to offer no advantage and may complicate product recovery. It is preferred to employ amounts of phenolic material between about 0.2% and about 2% by weight of the liquid phase reaction medium to suppress the foaming characteristics of the high boiling residue. Suitable phenolic materials for this purpose include phenol itself, the cresols and other alkyl-substituted phenols, e.g., p-isopropylphenol and o-(n-hexyl)phenol, pyrocatechol, resorcinol, pyrogallol, 1,2,4-benzenetriol, phloroglucinol and the like. Phenol and the cresols are preferred since they are the cheapest and most readily available. During the dehydration, the phenolic material reacts in an, as yet, undefined manner, presumably to form etheric materials and consequently must be replaced periodically or continuously. Phenol itself and the cresols, the preferred antifoaming agents, have substantial volatility at reaction conditions and are partially vaporized along with the aralkene product. When using phenol as the anti-foaming agent, about 20% of the phenol added can be volatilized in this manner.

lowing description thereof presuppose a continuous dehydration process, although this invention is not so limited.

Alpha-phenylethanol is introduced to reactor 10 via conduit 11. High surface area alumina is aslo added to conduit 11 via conduit 12 and thus passes to reactor 10. Disposed within reactor 10 is a liquid phase reaction medium 13 which, in this embodiment, is a mixture comprising high-boiling residue formed during the dehydration reaction, alpha-phenylethanol, alumina catalyst, and small amounts of styrene and water. It is to be noted that the alpha-phenylethanol and catalyst are introduced below the surface of the liquid phase reaction medium within reactor 10 in order to assure adequate mixing and contact between the alpha-phenylethanol and the catalyst and adequate dispersion of the catalyst within the liquid phase reaction medium. Reactor 10 is also equipped with an agitation system comprising agitator paddle 14, an agitator drive motor 15 and an agitator shaft 16 interconnecting the motor and the paddle.

Within reactor 10 the alpha-phenylethanol interacts with the catalyst and is dehydrated to form styrene, water, a small amount of high-boiling residue and a small amount of other by-products. Optionally, a small amount of phenol or phenolic material is also introduced to the reactor, by admixture with the alpha-phenylethanol or otherwise, to suppress the foaming tendency of the high-boiling residue which serves as the liquid phase reaction medium. The styrene and water formed in the dehydration action are volatilized as the reaction proceeds and are withdrawn as a vapor from reactor 10 via conduit 17 substantially as fast as such vapors are generated and are introduced to distillation zone 30.

The dehydration reaction being endothermic and the products of the reaction being withdrawn as vapors, substantial heat input (approximately 132 B.t.u./lb. of alpha-phenylethanol reacting, not including the heat requirements for the vaporization of the reaction products) is required for the conduct of the reaction. This heat is supplied to the reaction system by means of heating coils 19 disposed within reactor 10.

As the reaction proceeds, the small amount of high-boiling residue formed during the dehydration, together with added catalyst, accumulates within the reactor. When this accumulation exceeds the desired level, the surplus is withdrawn, periodically or continuously, from the reactor via conduit 20 in order to maintain a substantially constant inventory within the reactor.

Because of the temperatures involved in the dehydration reaction, alpha-phenylethanol is also volatilized along with the styrene and water reaction products. To minimize the loss of alpha-phenylethanol (and hence to minimize the size of the separate facilities otherwise necessary to recover and recycle this material) it is desirable to provide partial condensation facilities adapted to preferentially condense the alpha-phenylethanol. Since such facilities would necessarily also condense styrene and cause loss of yield by thermal polymerization, it is preferable to combine partial condensation with fractionation facilities. Accordingly, the vapor product of the reaction, withdrawn from reactor 10 via conduit 17, is introduced to distillation zone 30 as hereinabove indicated. Distillation zone 30 is a conventional fractionation system of known characteristics and contains, disposed therewithin, a plurality of vapor-fluid contacting devices equivalent to from about 2 to about 5 theoretical vapor-liquid contacting stages. It is to be noted that while distillation zone 30 is of conventional design, it is, in essence, equivalent to the enriching zone of a distillation column but does not have a corresponding stripping section. Within distillation zone 30, unreacted alpha-phenylethanol is separated from the styrene and water reaction products. The alpha-phenylethanol is withdrawn from the bottom of the distillation zone via conduit 18 and recycled to reactor 10. Styrene and water reaction products and other volatile reaction products, including trace amounts of aralkane and a relatively small proportion of the phenolic foam suppressant (if any) added to reactor 10, are withdrawn from the upper portion of distillation zone 30 via conduit 31, are condensed in heat exchanger 32 and introduced to distillate drum 34 via conduit 33.

Styrene and water being essentially immiscible, two phases form within distillate drum 34. The aqueous phase, containing substantially all of the water product of the reaction together with a substantial portion of the phenolic foam suppressant, and the organic phase, containing the desired styrene reaction product, are separated in the distillate drum. The styrene reaction product overflows weir 39 and is withdrawn from distillate drum 34 via conduit 35 and can be used as such or subjected (if desired) to further processing. The water by-product is withdrawn from distillate drum 34 via conduit 36 and is divided into two streams. A portion thereof is discarded via conduit 37 and the balance is returned to an upper portion of distillation zone 30 via conduit 38 to provide reflux for the fractionation. Reflux ratios suitable for the conduct of this fractionation are suitably between about 0.2 and about 3.0 moles of water reflux per mole of net overhead product, both styrene and water by-product. Obviously, as is known to those skilled in the art, the number of theoretical vapor-liquid contacting stages and reflux ratio employed in the hereinabove described fractionation are interrelated, lower reflux ratios being associated with greater numbers of contacting stages and vice versa. Also as known to those skilled in the art, the selection of an optimum number of vapor-liquid contacting stages and reflux ratio requires an optimization involving consideration of economic factors, extraneous to this invention. The use of water, rather than styrene, as the refluxing agent for this fractionation, minimizes the internal recycle of styrene with a consequent increase in styrene yield by minimizing the amount thereof lost due to thermal polymerization.

EXAMPLES

The following examples are further intended to illustrate this invention without limiting the scope thereof. Unless otherwise indicated, all parts and percents referred to in the following examples are on a weight basis. Selectivities, conversions and yields are presented on a molar basis, consistent with the definitions hereinabove presented.

Example I

The following series of runs are conducted to illustrate the effect of temperature upon the process of this invention. Each run is conducted by adding 1000 parts of triphenylmethane and 10 parts of catalyst to a reactor (similar to that illustrated in the annexed drawing) equipped with an agitator, heating coils and a 5-plate distillation column refluxed with system overhead at a ratio of about 1:1. After the system is heated to the desired temperature, feed is introduced at a constant rate of 100 parts of feed per hour per 100 parts of liquid phase reaction medium. Alpha-phenylethanol is the feedstock in each run and atmospheric pressure is used. In each run, a high surface area alumina having the following properties prior to preconditioning is used as catalyst:

$Al_2O_3$ (percent by wt.)—75%
Water (percent by wt.)—25%
$SiO_2$—0.01%
$Fe_2O_3$—0.01%
$Na_2O$—0.01%
Particle size—98% finer than 100 mesh This alumina catalyst is derived by hydrolysis of a trialkyl aluminum and is preconditioned by heating the catalyst at a temperature of 450° C. for a period of about 8 hours. After preconditioning, catalyst surface area is approximately 117 square meters per gram.

Table I below lists the temperatures of the runs, conversions and selectivity to styrene, to ethylbenzene (abbreviated as "E.B.") and to high-boiling residue (abbreviated as "H.B.").

TABLE I.—EFFECT OF TEMPERATURE

| | | | Alpha-phenylethanol | | | |
|---|---|---|---|---|---|---|
| | | | | Selectivity, percent— | | |
| Run No. | Temp., ° C. | Styrene yield, percent | Conversion, percent | To styrene | To E.B. | To H.B |
| 1 | 230 | 81 | 85 | 95.2 | 0.2 | 4.6 |
| 2 | 250 | 87 | 90 | 96.2 | .25 | 3.5 |
| 3 | 270 | 93 | 96 | 97.7 | .3 | 2.0 |
| 4 | 290 | 95 | 98 | 97.4 | .4 | 2.2 |
| 5 | 300 | 96 | 99 | 96.7 | 0.5 | 2.8 |
| A | 200 | 67 | 75 | 89.2 | 0.8 | 10.0 |
| B | 170 | 37 | 50 | 74.0 | 1.0 | 25.0 |
| 6 | 330 | 95 | 100 | 95.0 | 1.0 | 4.0 |

Runs A and B in the above table are controls and illustrate that use of temperatures of below about 200° C. surprisingly decreases selectivity as well as conversion, and hence yield. The remaining runs illustrate that selectivity and conversion, and hence yield, increase with increasing temperature to an optimum value within the range of roughly 260° C. to 300° C. and decreases only slightly as temperature increases further. Similar results are obtained with other catalysts as illustrated by Example II below, although optimum yields may be found to be obtained over slightly different temperature ranges with other catalysts.

Example II

Example I is repeated except that 2 parts of phosphoric acid are used as the catalyst in place of alumina. The results obtained are substantially similar to those of Example I in all respects except that slightly lower yields are obtained. For example, at 270° C., styrene yield is 92% corresponding to an alpha-phenylethanol conversion of 97%, a selectivity to styrene of 94.5%, a selectivity to ethylbenzene of about 0.25% and a selectivity to high boiling residue of about 5%.

Example III

The procedure of Example I, Run No. 3 is repeated employing the alumina catalyst of Example I except that the alumina is calcined at varying temperatures for varying times to modify (i.e., decrease) its surface area. Table II presents the results obtained.

TABLE II

| Run No. | Catalyst surface area sq. meters/gram | Yield to styrene, percent | Conversion, percent | Alpha-phenylethanol Selectivity, percent— | | |
|---|---|---|---|---|---|---|
| | | | | To styrene | To E.B. | To H.B |
| 1 | 500 | 93 | 99 | 94.1 | 0.4 | 5.0 |
| 2 | 200 | 90 | 93 | 97.3 | 0.2 | 2.5 |
| 3 | 120 | 92 | 93 | 98.7 | 0.1 | 1.2 |
| 4 | 60 | 80 | 82 | 97.9 | 0.1 | 2.0 |
| 5 | 40 | 73 | 75 | 97.3 | 0.2 | 2.5 |
| 6 | 25 | 53 | 55 | 96.5 | 0.3 | 3.2 |
| 7 | 15 | 40 | 42 | 94.5 | 0.4 | 5.1 |
| C | 3 | 17 | 20 | 87.3 | 0.7 | 12.0 |
| D | (1) | 4 | 5 | 80.2 | 1.0 | 18.8 |

[1] No catalyst.

As in the preceding table, the lettered runs are controls, not illustrative of the invention. The data of Table II establish that optimum catalyst surface area is in the range of roughly 100 to 200 square meters per gram. With higher surface areas, residue make increases; with lower surface areas, below about 15 square meters per gram, results are less satisfactory.

Example IV

The following runs are conducted to illustrated the variety of catalyts suitable for use in the process of this invention. The procedure outlined in Example I is employed. The reaction temperature in each run is 270° C. except for the lettered runs which are controls run at 200° C. Table III illustrates the results obtained.

TABLE III

| Run No. | Catalyst | Conversion, percent | Alpha-phenylethanol Selectivity, percent— | | |
|---|---|---|---|---|---|
| | | | To styrene | To E.B. | To H.B. |
| 1 | Sulfuric acid (98%) | 98 | 94.5 | 0.3 | 5.2 |
| 2 | p-Toluene sulfonic acid | 98 | 93.0 | 0.6 | 6.4 |
| 3 | Activated carbon [1] | 55 | 91.5 | 3.5 | 5.0 |
| 4 | Silica-alumina [2] | 98 | 89.8 | 6.0 | 4.2 |
| 5 | Alumina [3] | 95 | 95.3 | 0.2 | 4.5 |
| 6 | Alumina [4] | 96 | 94.8 | 0.2 | 5.0 |
| 7 | Phthalic anhydride | 98 | 96.9 | 0.6 | 2.5 |
| 8 | Montmorillonite [5] | 98 | 90.5 | 2.5 | 7.0 |
| 9 | Infusorial earth [6] | 95 | 90.8 | 5.0 | 4.2 |
| 10 | Attapulgite [7] | 94 | 91.2 | 3.5 | 5.3 |
| 11 | Phosphoric acid | 98 | 98.6 | 0.3 | 1.5 |
| 12 | Molecular sieve 13X [8] | 96 | 94.1 | 0.9 | 5.0 |
| 13 | Atlas clay [9] | 98 | 89.5 | 4.0 | 7.5 |
| 14 | Kaolin [10] | 90 | 92.7 | 2.1 | 5.2 |
| E | Phosphoric acid | 72.5 | 61.5 | 0.1 | 36.6 |
| F | Alumina [3] | 4.7 | 57 | 3.0 | 15.0 |
| G | Activated carbon [1] | 83 | 36 | 0.7 | 63.0 |

[1] Particle size=170–300 mesh; surface area=200 sq. meters/gm.
[2] 87% alumina; 13% silica; particle size=170–300 mesh; surface area=250 sq. meters/gm.
[3] Alcoa F-type. See column 7.
[4] Alcoa H-type. See column 7.
[5] Particle size=170–300 mesh; surface area=>500 sq. meters/gm.
[6] Particle size=170–300 mesh; surface area=>500 sq. meters/gm.
[7] Particle size=170–300 mesh; surface area=>500 sq. meters/gm.
[8] Particle size=170–300 mesh; surface area=>500 sq. meters/gm.
[9] Particle size=170–300 mesh; surface area=>500 sq. meters/gm.
[10] Particle size=170–300 mesh; surface area=30 sq. meters/gm.

Example V

The procedure of Example I is repeated, employing a variety of aralkanol feedstocks. In each case, the dehydration temperature is 270° C. Table IV which follows summarizes the results:

TABLE IV

| Run No. | Feedstock | Conversion, percent | Selectivity [1] |
|---|---|---|---|
| 1 | Dimethyl benzyl alcohol | 98.4 | 97.8 |
| 2 | Ethyl methyl benzyl alcohol | 99.3 | 98.2 |
| 3 | 4-methyl methyl benzyl alcohol | 97.3 | 97.3 |
| 4 | 3,5-dimethyl methyl benzyl alcohol | 95.8 | 96.2 |
| 5 | 4-isopropyl dimethyl benzyl alcohol | 98.2 | 97.5 |

[1] To corresponding aralkene.

Example VI

Ethyl benzene is continuously oxidized with molecular oxygen to form 100 parts/hr. of an oxidate containing 13% of alpha-phenylethyl hydroperoxide, 1% of alpha-phenylethanol, 1% of acetophenone and 85% of unreacted ethyl benzene. The conditions employed in this oxidation include a temperature of 140° C., a pressure of 10 p.s.i.g., a residence time within the oxidation reactor of 8 hrs. and an oxygen feed rate of 0.03 mole of oxygen/mole of ethylbenzene charged.

The oxidate, prepared as described above, is used to epoxidize propylene in accordance with the teachings of U.S. Pat. No. 3,351,635. Specifically, 100 parts/hr. of the above oxidate, 2 parts/hr. of molybdenum naphthenate, and 30 parts/hr. of propylene are charged to a reactor. Epoxidation reaction conditions include a temperature of 110° C., a pressure of 500 p.s.i.g. and a residence time of 1½ hours. The effluent from the reactor, 132 parts/hr., is distilled for the removal of propylene oxide product, unreacted propylene and ethylbenzene. It is then washed with aqueous alkali, water and distilled for removal of materials boiling at a higher temperature than alpha-phenylethanol. Analysis of the remaining material (i.e., the distillate) indicates that it contains 83.3% of alpha-phenylethanol, 15.6% of acetophenone, together with 1.1% of other impurities. Phenol is present in this material in an amount equivalent to 0.2% by weight.

The alpha-phenylethanol rich material from the epoxidation is continuously dehydrated in a reactor system similar to that depicted in the annexed drawing according to the following procedure.

The reactor is charged with 290 parts of tri-phenylmethane to serve as a liquid phase reaction medium. As the reaction proceeds and high-boiling residue is formed, a small amount of reaction medium is continuously purged to maintain constant inventory in the reactor. In this manner, the triphenylmethane is gradually displaced and replaced by high-boiling residue. The following description applies to the dehydration after about 200 hours of continuous operation at which time the bulk, but not all, of the triphenylmethane is purged.

To a reactor equipped with an agitation system, internal heating coils, and a 5-plate distillation column is charged 79.5 parts per hour of the alpha-phenylethanol-rich material obtained as described above and 0.0015 part per hour of a finely divided (95% smaller than 200 mesh) alumina of the following properties which is sufficient to provide an alumina concentration of 1 wt. percent in the liquid phase reaction medium.

| | |
|---|---|
| Alumina, wt. percent | 99+ |
| Water, wt. percent | <1 |
| Silica, wt. percent as $SiO_2$ | <0.013 |
| Iron, wt. percent as $Fe_2O_3$ | <0.013 |
| Alkali metals, wt. percent as $Na_2O$ | <0.013 |
| Surface area, sq. meters/gm. | 117 |

The reactor is maintained at 270° C. and pressure is controlled at about 5 p.s.i.g. Approximately 286.3 parts/hr. of vapor are generated and fed to the distillation column. Heat of reaction necessary to generate these vapors is provided by the heating coils. The overhead vapor from the distillation column (T=140° C.) is cooled to 43° C. whereby it is condensed. Water and organics are separated by decantation and 17.17 parts/hr. of water is recycled to the column as reflux. The remaining water in the overhead (8.63 parts/hr.) is discarded and the organics (69.2 parts/hr.; 75.2% styrene, 17.8% acetophenone, 5.7% alpha-phenylethanol and 1.2% impurities) are taken as the net product from the system. The bottoms from the distillation is recycled to the reactor.

Liquid level is controlled during the reaction to keep the reactor 70–80% full of liquid. To accomplish this, a continuous purge of liquid phase reaction medium (1.65 parts per hour; 94.6% high boiling residue, 0.9% each of alpha-phenylethanol and catalyst and 3.6% of acetophenone) is taken during the reaction.

Reactor space velocity is approximately 1.0 with space velocity being defined as volumes of feed per hour per volume of liquid phase reaction medium, both volumes being measured at actual reactor conditions.

Under the conditions hereinabove described, alpha-phenylethanol conversion is 94%, selectivity to styrene is over 98% (molar basis), selectivity to ethylbenzene is only 0.25% while less than 2 kg. of high-boiling residue is formed per 100 kg. moles of alpha-phenylethanol converted.

The foregoing description illustrates the methods of this invention whereby the advantages thereof are obtained. It will be understood that modifications and variations thereof may be effected by those skilled in the art without departing from the spirit of this invention. Accordingly, it is intended that all matter contained in the foregoing description shall be interpreted as illustrative and not in a limiting sense.

What is claimed is:

1. In a process for the catalytic dehydration of an aralkanol to an aralkene in the presence of a liquid phase reaction medium, the improvement which comprises conducting said dehydration at a temperature of at least 220° C. but below the decomposition temperature of the liquid phase reaction medium and in the presence of a catalyst selected from the group consisting of mineral acids, carboxylic acids, aryl sulphonic acids and solids having surface areas in excess of 15 sq. meters/gm.

2. A process in accordance with claim 1 wherein the aralkanol is selected from the group consisting of alpha-phenylethanol, alpha-alkyl-alpha-phenylethanol, and the nuclear alkyl substituted derivatives of the foregoing.

3. A process in accordance with claim 1 wherein the aralkanol has the following structural formula:

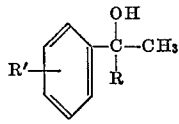

wherein R and R' are each independently selected from the group consisting of hydrogen and lower alkyl radicals containing not more than 5 carbon atoms.

4. A process in accordance with claim 3 wherein R and R' together contain not more than a total of 3 carbon atoms.

5. A process in accordance with claim 1 wherein the aralkanol is alpha-phenylethanol and the aralkene is styrene.

6. A process in accordance with claim 1 wherein the aralkanol is alpha,alpha-dimethylbenzyl alcohol and the aralkene is alpha-methylstyrene.

7. A process in accordance with claim 1 wherein the dehydration temperature is between about 220° C. and about 310° C.

8. A process in accordance with claim 7 wherein the dehydration reaction temperature is within the range of from about 250° C. to about 300° C.

9. A process in accordance with claim 1 wherein the dehydration catalyst is a finely divided alumina having a surface area in excess of about 15 sq. meters/gram.

10. In a process for the preparation of styrene by the catalytic dehydration of alpha-phenylethanol in the presence of a liquid phase reaction medium, the improvement which comprises conducting said dehydration at a temperature above about 200° C. but below the decomposition temperature of the liquid phase reaction medium and using, as the catalyst, an alumina having a surface area in excess of about 15 sq. meters/gram.

References Cited
UNITED STATES PATENTS

| | | | |
|---|---|---|---|
| 2,507,506 | 5/1950 | Dreisbach et al. | 260—669 X |
| 3,391,198 | 7/1968 | Joris et al. | 260—669 X |
| 3,442,963 | 5/1969 | Korchak | 260—669 |

DELBERT E. GANTZ, Primary Examiner

C. R. DAVIS, Assistant Examiner